DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 1, 1970

881 O.G. 21

T881,001

COLOR STABILIZATION OF ISOCYANATE ETHER SOLUTIONS

Arthur P. Werts III, 1362 Lafayette Circle, and Sidney B. Miller, Jr., 4426 Glenden Road, both of Kingsport, Tenn. 37664

Filed Apr. 9, 1970, Ser. No. 27,103
Int. Cl. C08f *45/72, 45/58*
U.S. Cl. 252—182
No Drawing. 7 Pages Specification

Solutions of isocyanates in solvents containing ether or ether/ester groups to be employed in the manufacture of polyurethane products to be used as industrial coatings are stabilized against undesirable color formation by dissolving in the solvent component a small amount of a phenol such as 2,6-ditertiarybutyl-p-cresol, 2,6-dioctadecyl-p-cresol, toluhydroquinone, and hydroquinone monomethyl ether (p-methoxyphenol). Alternatively, the stabilizer may be added to the solution of the isocyanate in the solvent. Solutions of isocyanates stabilized by the addition of these compounds are found to have excellent keeping properties and may be stored for indefinite periods without color formation. When such solutions are employed in the manufacture of polyurethanes no adverse color is carried into the polyurethane product or the coatings produced therefrom.